Feb. 5, 1957 R. T. BONATZ 2,780,305
ELECTROSTATIC PRECIPITATORS
Filed Dec. 1, 1953
Fig. 1
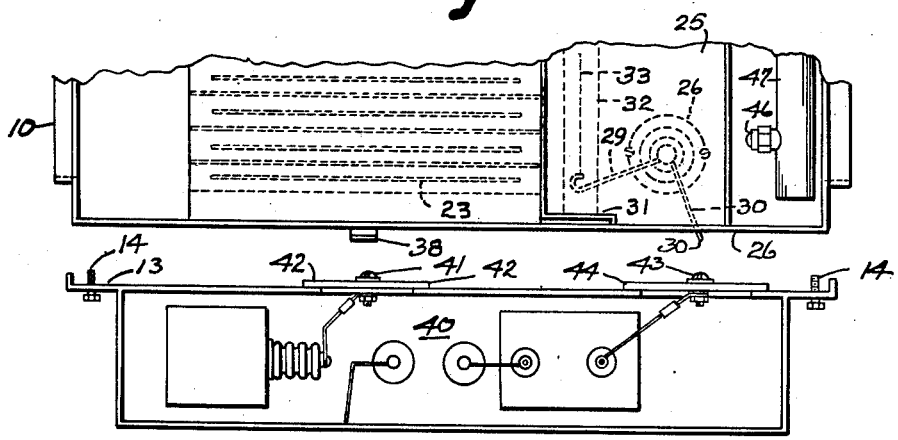
Fig. 2
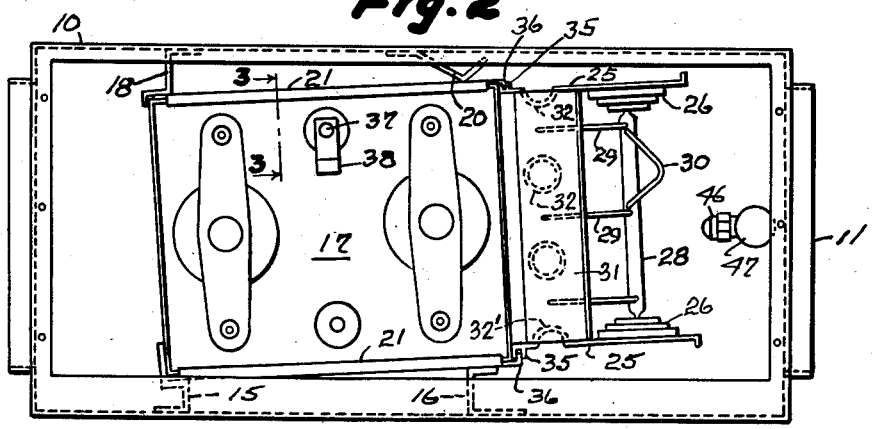

Fig. 6
INVENTOR.
BY Richard T. Bonatz
Robert T. Palmer
Attorney

# United States Patent Office 2,780,305
Patented Feb. 5, 1957

2,780,305
ELECTROSTATIC PRECIPITATORS

Richard T. Bonatz, Norwood, Mass., assignor to Westinghouse Electric Corporation, East Pittsburgh, Pa., a corporation of Pennsylvania Application December 1, 1953, Serial No. 395,454

5 Claims. (Cl. 183—7)

This invention relates to electrostatic precipitators for the removal of small foreign particles such as dust, from gases such as air.

Objects of this invention are to reduce the size and manufacturing cost of electrostatic precipitators.

Other objects of this invention are to provide for the easy removal and replacement of the components of an electrostatic precipitator.

A feature of this invention is that a collector cell is insertable and removable through an access panel of an electrostatic precipitator, the cell being slidable upon rails on the floor of the precipitator.

Another feature of this invention is that the ionizer of the precipitator is slidably attached to the collector cell, and is insertable and removable through the same access panel that the collector cell is.

Another feature of this invention is that the access panel has the power pack for the precipitator attached thereto, and when the access panel is in position, the high voltage terminals of the power pack are connected to the charge plates of the cell and to the ionizer wires.

This invention will now be described with reference to the drawings, of which:

Fig. 1 is a partial plan view, with upper wall removed, of an electrostatic precipitator embodying this invention, the access panel being shown spaced from the wall from which it is supported;

Fig. 2 is an end elevation of the precipitator with the access panel removed;

Fig. 6 is an enlarged detail view showing the guideways for slidably supporting the ionizer from the collector cell at the top of the cell.

Figure 3:
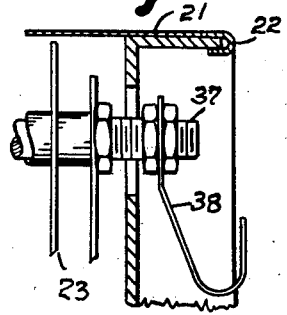
Fig. 3 is an enlarged fragmentary section along the line 3—3 of Fig. 2.
Figure 4:
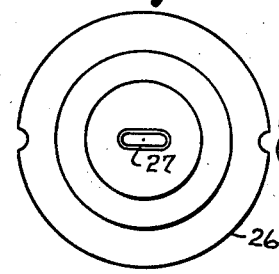
Fig. 4 is an enlarged end elevation of one of the insulators used to support the ionizer wire assembly.
Figure 5:
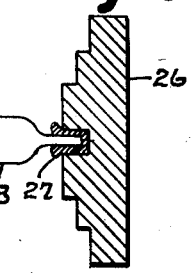
Fig. 5 is an enlarged side elevation, in section, of the insulator of Fig. 4, with a portion of the ionizer wire supporting rod supported from the insulator.

The casing 10 of the precipitator has a gas inlet 11 in one vertical side wall, and a gas outlet 12 in the opposite side wall. A vertical end wall of the casing has a removable access panel 13 adapted to be secured thereto by the screws 14.

The casing 10 has on its floor the rails 15 and 16 for slidably supporting the collector cell 17 which is of the type disclosed in detail in the E. L. Richardson Patent No. 2,535,696. The bracket 18 is attached to the upper wall of the casing and contacts the upper side of the downstream end of the cell 17 and acts as a guide and support for the cell. The resilient support 20 of spring metal attached to the upper wall of the casing contacts the upper protection plate 21 of the cell and aids in supporting the cell in operating position.

The cell has the upper and lower plates 21 which are bent over at their ends around the outer ends of the outwardly extending end walls of the cell at 22 as illustrated by Figs. 2 and 3. These plates protect the upper and lower ends of the collector plates 23 of the cell from damage in handling, and serve also for preventing, together with the rails 15 and 16 and the spring support 20, gas from bypassing the cell as it passes through the casing.

The ionizer 24 consists of the upper and lower plates 25 to the inner surfaces of which the electric insulators 26 are attached. The insulators have central openings in their inner sides in which are contained resilient inserts 27 of neoprene or rubber or the like, which extend around and grip the flattened outer ends of the metal rods 28. The rods 28 support the resilient ionizer wire supporting arms 29 of metal, and the metal contact spring 30. The ionizer 24 also has the side plates 31 between which the metal ionizer tubes 32 extend and which form non-discharging ionizer electrodes. Semi-circular indentations 32' in the upper and lower plates 25 of the ionizer form end non-discharging ionizer electrodes. The ionizer wires 33 are supported by the arms 29 and extend between the non-discharging ionizer electrodes.

The downstream ends of the plates 25 have the U-shaped brackets 35 formed thereon and which form guideways in which extend the end members 36 which extend from the upstream end of the collector cell at the top and bottom thereof.

One of the tie rods 37 which support the charge plates of the collector cell has a contact spring 38 secured thereto for making contact with a high voltage terminal 41 of the power pack 40 which is attached to the access panel 13, when the access panel is in operating position. The terminal 41 is supported by the insulating plate 42 which is secured to the access panel 13 around a clearance hole therein for the terminal 41. The terminal 41 may be a +6 kv. terminal of the power pack.

The terminal 43 of the power pack, which may be a 12.8 kv. positive terminal, is supported on the insulating plate 44 which is attached to the access panel 13 around a clearance hole therein for the terminal 43. The terminal 43 makes contact with the contact spring 30 of the ionizer wires when the access panel is in operating position.

The power pack 40 is a conventional voltage doubler power pack of the type commonly used for energizing electrostatic precipitators.

The spray nozzles 46 attached to the liquid header 47 are for spraying water on the ionizer and collector plates for cleaning the dust which has deposited thereon.

With the access panel removed, the collector cell can easily be removed and replaced by sliding it on the rails 15 and 16. The ionizer can easily be removed and replaced by sliding it with its guideways 35 straddling the inwardly turned ends of the cell members 36.

When the access panel 13 is in operating position, the +6 kv. terminal of the power pack 40 contacts the contact spring 38 of the charge collector plates, and the +12.8 kv. terminal of the power pack contacts the contact spring 30 of the ionizer wires. Thus, not only are the high voltage connections automatically made when the precipitator is assembled but handling hazards are reduced by the automatic disconnecting of the high voltage when access to the ionizer and collector cell is provided by the removal of the access panel.

While one embodiment of the invention has been described for the purpose of illustration, it should be understood that the invention is not limited to the exact apparatus and arrangement of apparatus illustrated and described, since modifications thereof may be suggested by those skilled in the art without departure from the essence of the invention.

What is claimed is:

1. An electrostatic precipitator comprising a casing having a gas inlet and a gas outlet, an access panel for attachment to a side wall of said casing extending between said inlet and outlet, said casing having a lower wall with cell supporting rails thereon extending from adjacent said side wall to adjacent the opposite side wall, a collector cell slidably supported on said rails, ionizer supporting members extending from the top and bottom of the upstream end of said cell towards said inlet and between said side walls, and an ionizer assembly slidably supported by said members, said cell and assembly being insertable into and removable from said casing through said one side wall when said access panel is removed.

2. An electrostatic precipitator as claimed in claim 1 in which a power pack for said precipitator is mounted on the outer side of said panel, and in which high voltage terminals of said pack contact electrical connections to said ionizer assembly and said cell when said panel is in position on said one wall.

3. A collector cell for an electrostatic precipitator comprising a plurality of parallel collector plates, means including a pair of walls at the ends of said cell and spaced outwardly from the end ones of said collector plates for supporting said plates, said walls having outwardly turned portions extending in planes substantially perpendicular to the planes of said plates, and a pair of plates at opposite sides of said cell spaced from the edges of said collector plates and secured to said wall portions and extending from one of said walls to the other.

4. A collector cell as claimed in claim 3 in which the said pair of plates are secured to the wall portions by being turned over at their ends around the outer ends of said wall portions.

5. An ionizer assembly for an electrostatic precipitator comprising end and side plates, two pairs of disc-shaped insulators attached at their outer sides to the inner sides of said end plates, said insulators having openings in the centers of their inner sides and having resilient inserts in said openings, said inserts having slot-shaped openings therein, a pair of tubular metal members having flattened ends in said slot-shaped openings, ionizer wire supporting arms attached to said members, spaced-apart, parallel ionizer wires supported by said arms, and spaced-apart non-discharging ionizer electrodes extending between said side plates parallel to and intermediate said wires.

References Cited in the file of this patent
UNITED STATES PATENTS

| | | |
|---|---|---|
| 2,486,520 | Dahlman | Nov. 1, 1949 |
| 2,535,696 | Richardson | Dec. 26, 1950 |
| 2,639,781 | Savitz | May 26, 1953 |
| 2,662,608 | Fields | Dec. 15, 1953 |
| 2,696,893 | Richardson | Dec. 14, 1954 |